(12) United States Patent
Tojo

(10) Patent No.: US 6,507,345 B1
(45) Date of Patent: *Jan. 14, 2003

(54) APPARATUS AND METHOD FOR CREATING GRAPHICS

(75) Inventor: Takashi Tojo, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 819 days.

(21) Appl. No.: 08/829,424

(22) Filed: Mar. 31, 1997

(30) Foreign Application Priority Data

Aug. 26, 1996 (JP) .............................. 8-223594

(51) Int. Cl.[7] ................................. G09G 5/00
(52) U.S. Cl. ....................... 345/473; 345/810; 345/815; 345/823; 345/835; 345/157
(58) Field of Search ................................. 345/473, 474, 345/475, 122, 127, 130, 131, 348, 352, 145, 146, 835, 837, 810, 815, 821, 823; 273/148 B

(56) References Cited

U.S. PATENT DOCUMENTS

| | | | | |
|---|---|---|---|---|
| 5,146,558 A | * | 9/1992 | Inoue | 395/511 |
| 5,169,342 A | * | 12/1992 | Steele et al. | 345/146 |
| 5,303,388 A | * | 4/1994 | Kreitman et al. | 395/159 |
| 5,347,628 A | * | 9/1994 | Brewer et al. | 395/159 |
| 5,404,442 A | * | 4/1995 | Foster et al. | 395/159 |
| 5,592,602 A | * | 1/1997 | Edmunds et al. | 395/174 |
| 5,611,031 A | * | 3/1997 | Hertzfeld et al. | 395/133 |
| 5,682,511 A | * | 10/1997 | Sposato et al. | 395/353 |
| 5,710,894 A | * | 1/1998 | Maulsby et al. | 395/326 |
| 5,838,316 A | * | 11/1998 | Arruza | 345/334 |

* cited by examiner

Primary Examiner—Lun-Yi Lao
(74) Attorney, Agent, or Firm—Staas & Halsey LLP

(57) ABSTRACT

An apparatus and method for creating graphics in which an image pattern to be pasted is displayed on the screen of a display unit through a display content VRAM, by inputting an operation command from an operator for pasting the image pattern on the display screen of a display unit from an input unit, referring to pattern data to be pasted and also referring to animation information data, obtaining information on how the form and color temporarily change when the pattern is pasted, creating the display data, and displaying the display data on the screen of the display unit.

13 Claims, 12 Drawing Sheets

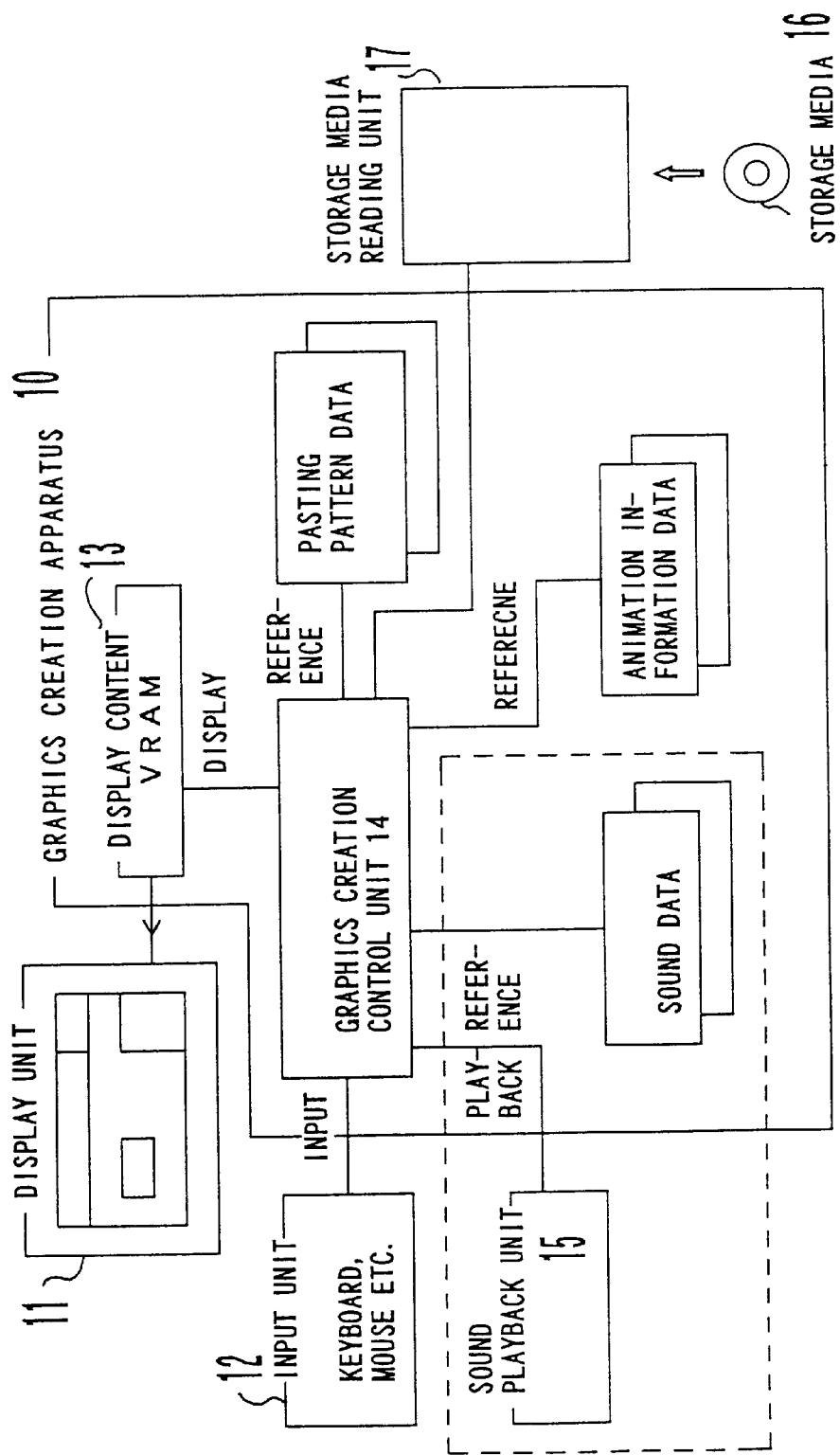
F I G. 1

APPARATUS AND METHOD FOR CREATING GRAPHICS

BACKGROUND OF THE INVENTION

1. Field of the Invention

The present invention relates to an apparatus for creating any graphics on a display, and more particularly to a method of displaying the graphics for a pasting operation.

2. Description of the Related Art

Generally, the conventional graphics creation apparatus does not have a function of indicating to a user a result of a pasting process when a pattern of graphics is selected and pasted by an input device, such as a keyboard or a mouse, on a display during creation of graphics, however sound data corresponding to the process may be reproduced under some situations.

For example, application software running on a computer for creating graphics is used in order to paste a prepared image pattern on a display during creation of graphics. The application is type of software, which functions in such a way that a required image is selected by a mouse, etc., then moved to the position for pasting by dragging, and pasted to the selected position by releasing a mouse button, etc., can be seen in many places.

Further, there is newly-devised application software which has the function of changing the form of a mouse cursor to the same image as the selected image, for clearly designating which pattern selected is. In this case, the mouse cursor whose form has been changed to be the same as the selected image pattern is moved to the designated position where the image pattern is to be pasted, and then the selected image pattern is pasted by selecting with the mouse button at this position.

Most of the conventional graphics creation apparatuses operate in such a way that the form of the mouse cursor is changed to a selected pattern and then the position for the image to be pasted is decided. This method has an advantage in which it is easy to capture the appearance when the selected image is positioned, although it is difficult to decide whether or not the selected image has been pasted correctly. Accordingly, corresponding sound is reproduced after the pasting operation was completed. However, the reproduction of the sound is not enough because the result of the operation cannot be captured visually.

In particular, in the case of a drawing application software for children, mouse operation is not accurate enough for pasting the picture image at a correct position, or they become weary of the operation because they are children. In the case of the drawing application software for children, it is important to devise ways of making the children happy, but the conventional software is not effective in making children happy, because only the sound is played.

SUMMARY OF THE INVENTION

It is an object of the present invention to provide a graphics creation apparatus and a method by which it can be recognized very easily whether or not an image is pasted correctly, and in which children can be entertained while creating graphics.

The graphics creation method of the present invention includes the steps of selecting the image pattern to be pasted on a display, placing the image pattern at the position to be pasted, and displaying a special animation image when pasting operation of the image pattern is correctly completed.

The graphics creation apparatus includes; an input unit for inputting a command from a uses to paste the image pattern on the display; a graphics creation unit for creating display data to be displayed based on animation information data when the image pattern is pasted on the display, with reference to the image pattern data pasted on a screen by the command from the input unit and to the animation information data displayed when the image pattern is pasted; and a display unit for displaying the display data created by the graphics creation unit.

According to the graphics creation apparatus or an application software running on the computer for creating the graphics of the present invention, an animation is displayed, which has already been predetermined for each image pattern or each operation, when the specific image pattern selected from a menu is pasted on the display. Thus, the user can recognize visually whether or not the pasting operation has been successfully completed. Further, children will be interested in this operation when they use the apparatus. Accordingly, a significant contribution to children's entertainment and education industry can be expected.

The animation, which is displayed when the image pattern is pasted, can be displayed by using animation information data or program data for changing the form or color of the image pattern to be pasted, by executing a specified procedure.

For example, in the case of pasting the picture image of a dog, it becomes possible to indicate that the image of the dog has been correctly pasted by temporarily displaying an enlarged image of the dog.

BRIEF DESCRIPTION OF THE DRAWINGS

The present invention will be more apparent from the following detailed description in conjunction with the accompanying drawings, in which:

FIG. 1 is a block diagram showing the configuration of the preferred embodiment of the graphics creation apparatus of the present invention;

DESCRIPTION OF THE PREFERRED EMBODIMENT

Figure 2A:
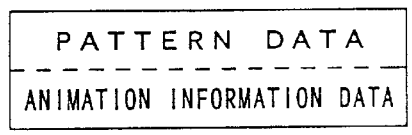
FIGS. 2A through 2C illustrate the relationship between pattern data and animation information data.

In the present invention, an animation information is prepared and then displayed subsequent to the pasting operation. Accordingly, the operator can recognize the completion of pasting visually.

FIG. 1 is a block diagram showing the structure of the preferred embodiment of the graphics creation system of the present invention.

The graphics creation system of the present invention includes a graphics creation unit 10, a display unit 11 for displaying a graphics created by the graphics creation unit 10, an input unit 12 for inputting a command for creating the graphics to the graphics creation unit 10. The input unit 12 is a keyboard, a mouse, etc. Here, a sound playback unit 15, which reproduces sound data when pasting is operated correctly, can be included in the apparatus, but it is not a basic requirement of the present invention.

In the graphics creation unit 10, a graphics creation control unit 14 which is structured by a CPU, etc. is included, and all input data from the input unit 12 are input to the graphics creation control unit 14 and processed. ROM or RAM is included in the graphics creation unit 10, and animation information data, which relate to an animation displayed when image are pasted correctly, and pattern data of image to be pasted are stored.

The graphics creation control unit 14 refers to the animation information data and pattern data of an image to be pasted after it receives a command from the input unit 12, and then sends image data to a display content VRAM 13 by generating the image data. Thus, the image data, which are created in the graphics creation control unit 14 and stored in a display content VRAM 13, are displayed as a graphics on the display unit 11.

For pasting, the sound playback unit 15 is included for outputting sound, in addition, sound data are provided to the graphics unit 10 in order to output the various sounds according to each requirement. In this case, the graphics creation control unit 14 refers to the sound data according to the command input from the input unit 12, and then commands the sound playback unit 15 to output the sound.

Here, as described above, in the present invention, the configuration which is shown in FIG. 1 as enclosed with a dotted line, is not a basic requirement, because it is not necessarily required to output a corresponding sound. For outputting the sound, the system is configured in such a way that the graphics creation control unit 14 is able to refer sound data in order for sound matching the command from the input unit 12 can be output. Here, it is possible to configure in such a way that the animation information data are formed as an object, etc., and the sound is output along with the execution of the data.

The animation information data as described above can be program data which change display pattern data for pasting according to the designated process. Next, the explanation for the present invention is made for the case in which data designating the animation image contain not only the data specifically designating the animation image itself, but also the program data which change the image pattern by the designed method.

The graphics creation control unit 14 has a storage media reading unit 17 connected to it, and the processing program which the graphics creation control unit 14 executes can be read. At first, a storage media 16 (for example, a CD-ROM, etc.) in which the processing program executed by the graphics creation control unit 14 is stored, is inserted into the storage media reading unit 17, which then reads data such as programs stored in the storage media 16. The read data are stored in the memory of the graphics creation control unit 14, and the graphics creation control unit 14 executes the processing described above.

FIG. 2A illustrates the relationship between pattern data and animation information data.

When creating the graphics, in the case of a pasting image to be displayed with an animation, it is necessary that the animation information is prepared for each image pattern, and that the image pattern is associated with the animation information.

FIG. 2A illustrates the method for holding the pattern data together with the animation information data. In FIG. 1, the structure, in which the pattern data to be pasted and the animation information data are stored separately, is shown. In this case, it is shown that the pattern data and the animation information data are stored in a memory as a pair.

The graphics creation control unit 14 reads the pattern data to be pasted, and then reads the animation information data, and displays on the display unit 11 the animation according to the animation information data which have been read, when the designated command is input from the input device.

Further, it is also possible that the graphics creation control unit 14 can read the corresponding animation information data when it reads the pattern data, by an address pointer in which the corresponding animation information data are stored being included in pattern data.

Figure 2B:
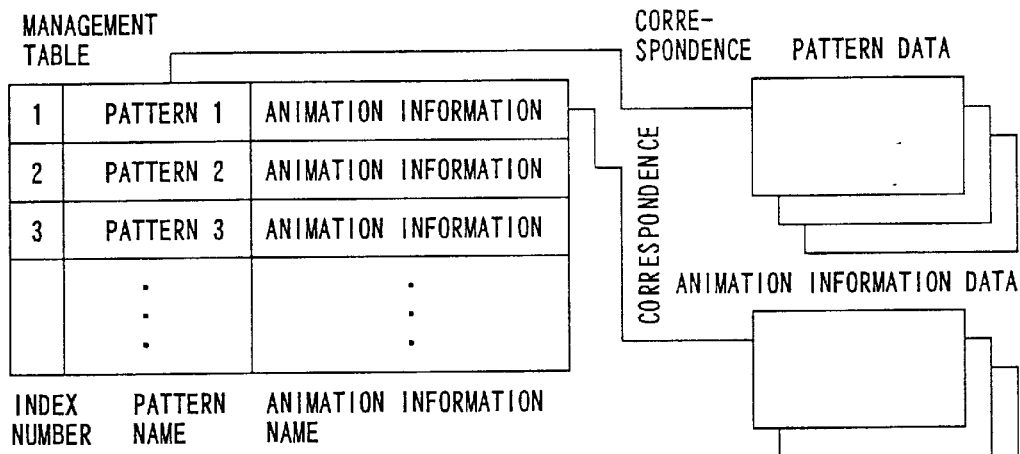

FIG. 2B shows the method for corresponding the image pattern with animation information by management table.

A set of an index number, a pattern name, and an animation information name are stored in the management table. Each pattern name in the pattern name column of the management table is linked to the corresponding data of the pattern data group, which is stored separately by a pattern name or a pointer. In the same manner, the animation information data group stored separately is linked to the animation information name and the pointer of the management table, and structured in a way that the desirable pattern data and animation information data are referred to when the graphics creation control unit 14 refers the management table.

Further, the pattern data and the pattern name, and the animation information name and the animation information data can be linked respectively by the index number provided in the management table.

For example, when the graphics creation control unit 14 refers the management table, firstly the column in which the corresponding pattern name exists is searched, and then the index number for its column is obtained. The pattern data and the animation information data are managed by this index number, and the graphics creation control unit 14 obtains the pattern data and the animation information data according to this index number.

Thus obtained pattern data and animation information data are output on the display unit 11.

Figure 2C:
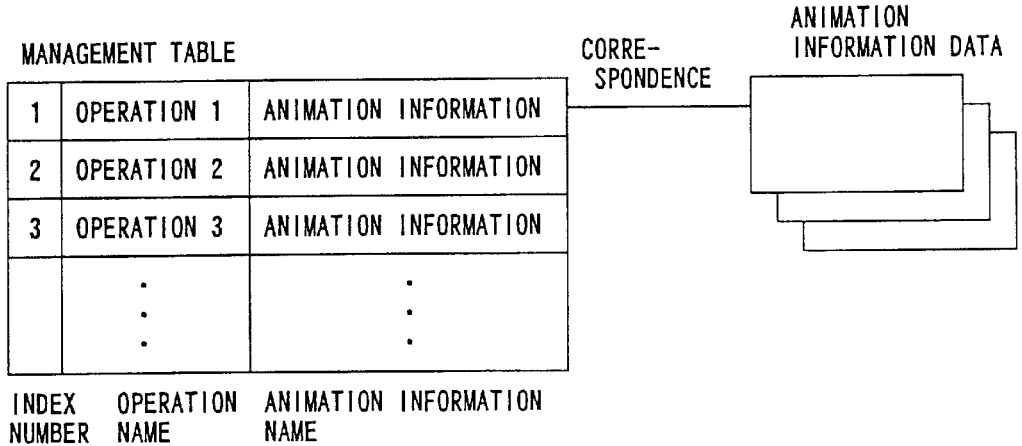

FIG. 2C shows the method by which the animation information is prepared for the operation.

In FIGS. 2A and 2B, the animation information corresponds to each pattern of the image displayed on the display unit 11, and an image is displayed based on the different animation information for the different image pattern. In the case of FIG. 2C, the system is configured in such a way that each different image is displayed for each input operation request from the input unit 12.

For example, the animation image is displayed by changing the color for the pasting operation when the input operation for drawing a straight line, requested by the input unit 12, is executed, while the image pattern is pasted by temporary enlarging the size of the image pattern for the operation in which a prepared image pattern is pasted.

As shown in FIG. 2C, the management table is prepared, and the operation command input from the input unit 12 is received and analyzed by the graphics creation control unit 14, and then the corresponding operation name is searched in the management table. The animation information name corresponding to the operation name in the management table is managed, and the animation information data are also corresponded to the animation information name as explained in FIG. 2A.

Thus, the graphics creation control unit 14 reads the corresponding animation information data according to the operation name, and the graphics are displayed based on the animation information data which have been read when a corresponding operation has done.

Figure 3:
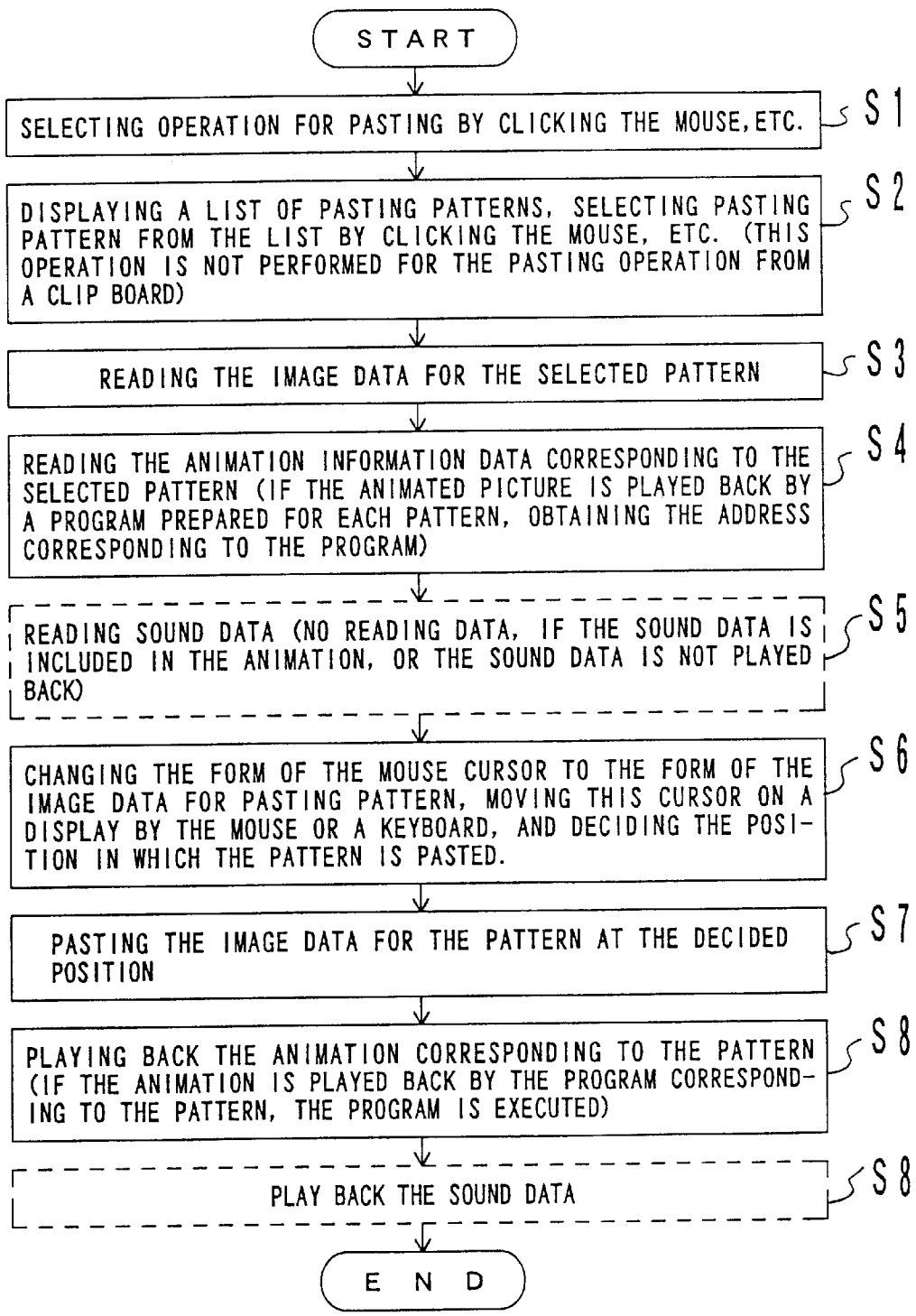
FIG. 3 is a flowchart of an image pattern pasting process.

FIG. 3 is a flowchart of an image pasting process.

At first, a menu for selecting an operation is displayed on the graphics creation screen of display unit 11, and the operation for pasting an image is selected by clicking the mouse button (Step S1). Then, a list of the image patterns to be pasted is displayed, and the image pattern to be pasted is selected by selecting the image pattern with the mouse, etc. (Step S2). When the image pattern to be pasted has been selected, the image data for the selected pattern are read (Step S3), and then the animation information data corresponding to the selected pattern are read (Step S4). At this point, when the animation image is to be realized (for example, by enlarging or reducing the size of the image) by a program prepared for each pattern, the corresponding program address is obtained (also in Step S4). Further, when the sound is to be played, the sound data are read (Step S5). However, this Step S5 is not required if the sound is included as a part of an object in case that the animation image has already been structured as the object, etc., or not produced.

Next, after the mouse cursor design has been changed to the shape of the pattern image data to be pasted, the mouse cursor is moved on the screen by an input unit 12 such as the mouse or the keyboard, and the position in which the pattern will be pasted is decided by clicking the mouse button (Step S6). In this case, the design of the mouse cursor is changed to the form of the image data of the pattern to be pasted, but, as another method, pattern to be pasted can be attached at the top of the arrow of the cursor.

At Step S7, the image data for the pattern is pasted at the designated position, and the animation image corresponding to the pattern is played back at Step S8. Or, the program is executed when the animation image is played back by the program corresponding to the pattern.

At Step S9, the sound data are played back, although this is not a necessary condition when the sound data are read at Step S5.

The processing order for the Steps S3, S4, and S5 among the above described steps cannot be fixed, and the steps S4 and S5 can be executed immediately before the steps S8 and S9. In the same manner, the processing order for the steps S7, S8, and S9 cannot be fixed for execution.

Figure 4:
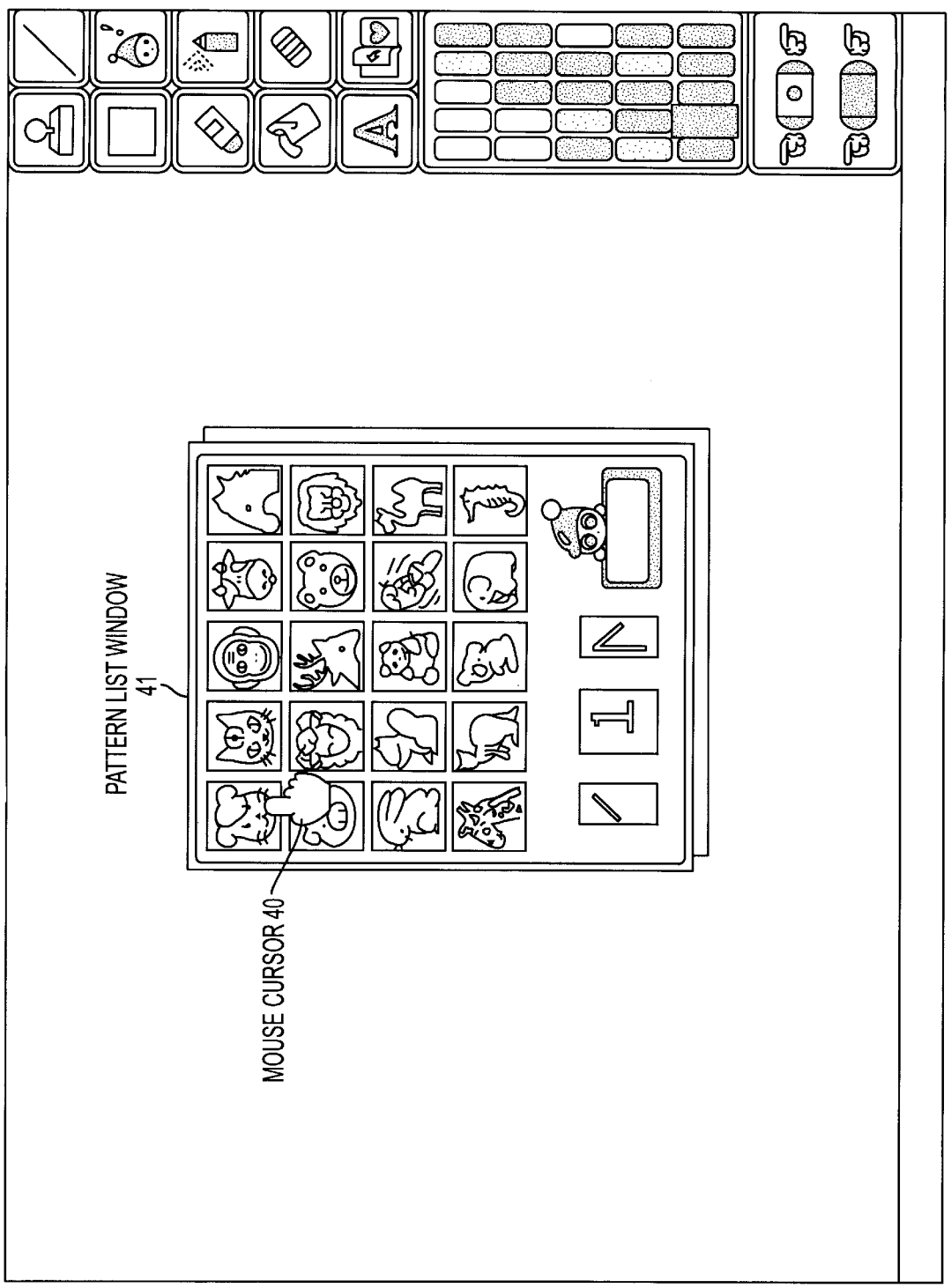
FIG. 4 is an initial display example of graphics creation screen according to the present invention.

FIG. 4 is an example of graphics creation screen to illustrate an operation of an apparatus and a method of the present invention.

FIG. 4 is a screen example as executed by a drawing application software for children, and the screen shows an activated pattern list window 41 in which the various kinds of image patterns pastable on a main screen are listed. Further, a mouse cursor 40 formed in the shape of a human hand is displayed, and points out the image pattern of a dog. The operation for pasting on the main screen after selecting this image of the dog is explained in the following description with reference to FIGS. 5 and 6. In the case where the dog's picture is selected from the pattern list window 41 in FIG. 4, the mouse cursor is moved to the position of the dog's image and the image is selected with the mouse, etc., as shown in FIG. 4.

Figure 5:
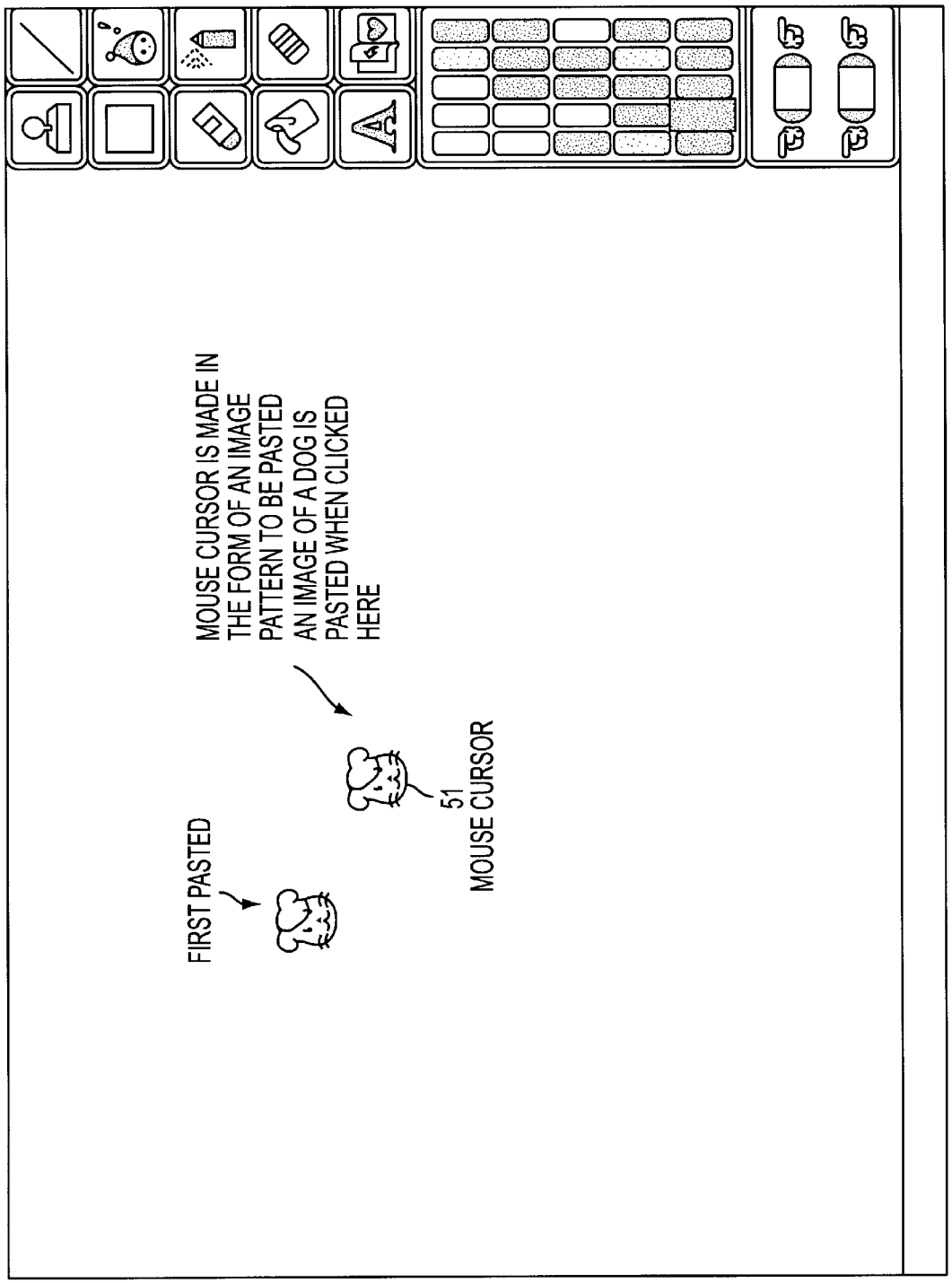
FIG. 5 is the first display example of the present invention.

As shown in FIG. 5, when the dog's picture is selected from the pattern list window 41 of FIG. 4, the pattern list window 41 disappears from the screen, and subsequently a mouse cursor 51 in the form of the dog's picture is displayed, as illustrated in FIG. 5. Thus, by forming the mouse cursor 51 with the selected image, the user can checks whether or not the correct image is selected.

When the mouse button is clicked again after the mouse cursor 51 becomes the form of the selected image pattern, the image pattern is pasted on the main screen. Wherever the mouse is clicked, the image pattern is pasted. In the case shown in FIG. 5, the dog's picture can be pasted repeatedly on the main screen. According to the present invention, the animation image is displayed when this dog's picture is pasted.

Figure 6:
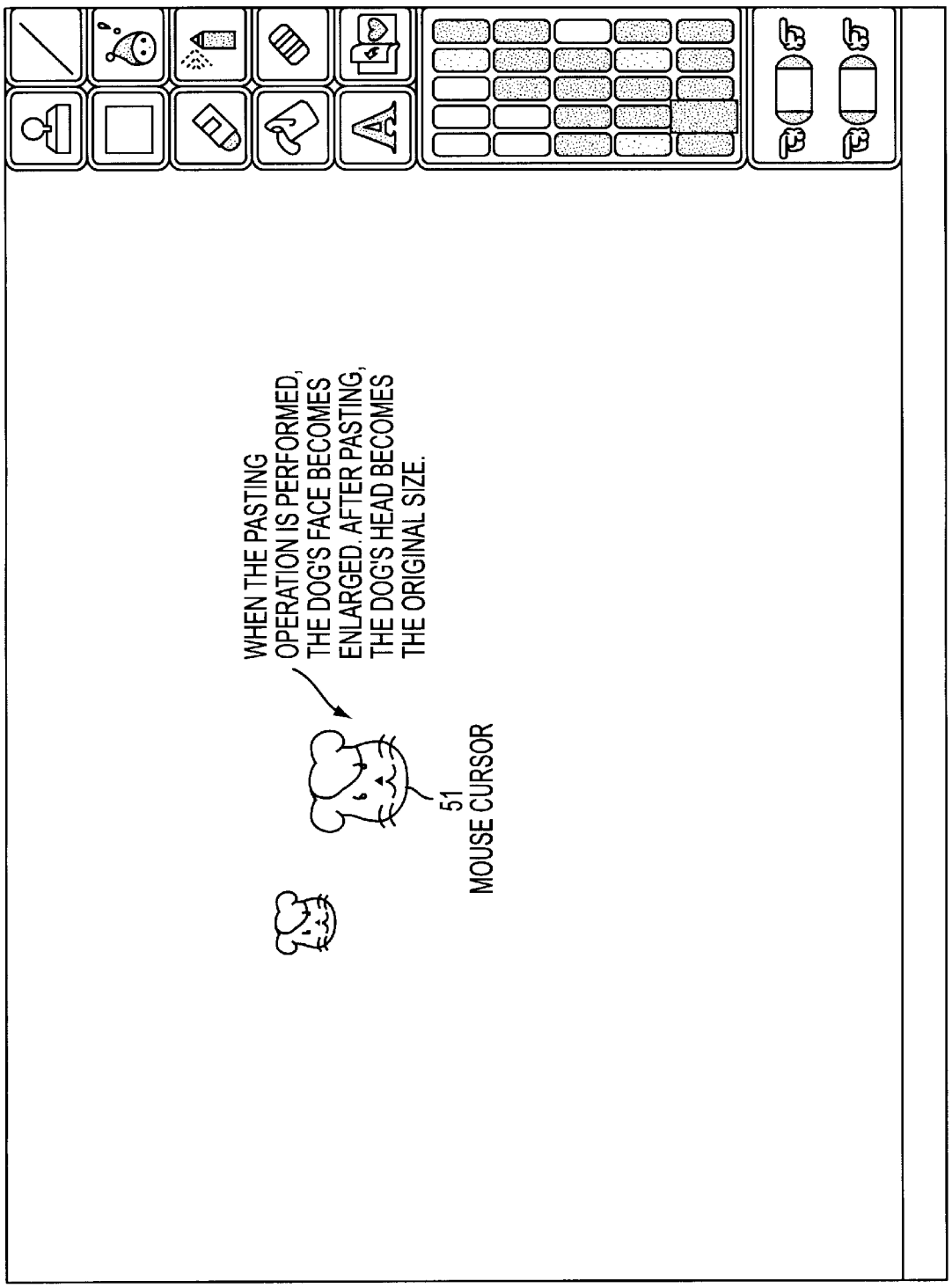
FIG. 6 is the second display example of the present invention.

In FIG. 6, the case where the dog's picture has been pasted is illustrated.

The animation image, in which the dog's picture becomes larger after the mouse cursor 51 in the form of the dog's face is clicked, is illustrated in FIG. 6. After the display operation of an animation image is finished, the size of the dog's face becomes the original size, and then, the pasting operation finishes. Thus, by enlarging the size of the dog's face in order to indicate a normal pasting operation, it can be checked visually that the pasting operation has performed successfully, and accordingly it is possible for the software to attract children's interest. As a result, this method is very useful not only for systems adults use, but also for systems that children use, contributing in particular to children's entertainment and education industry.

Figure 7:
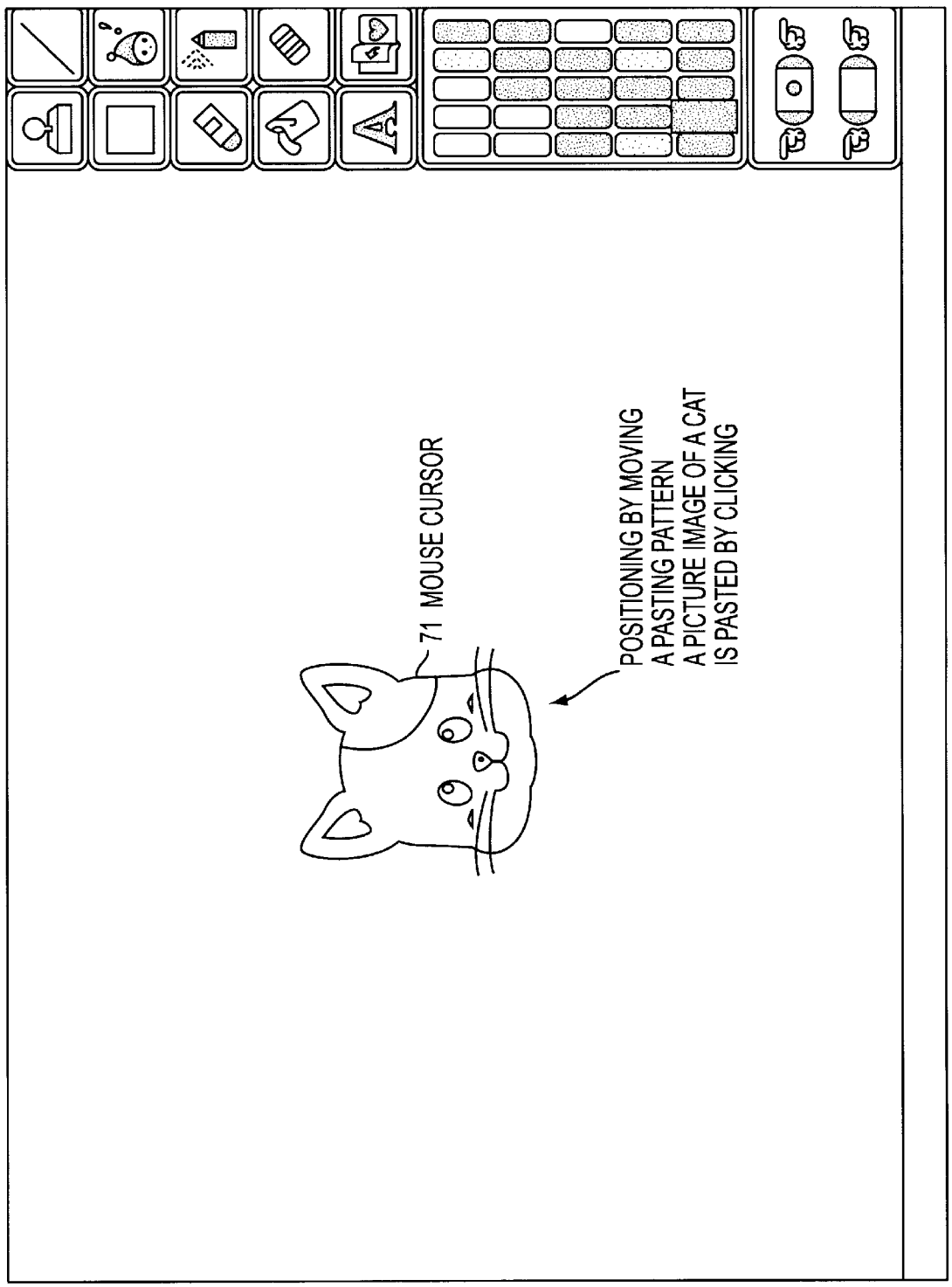
FIG. 7 is the third display example of the present invention.
Figure 8:
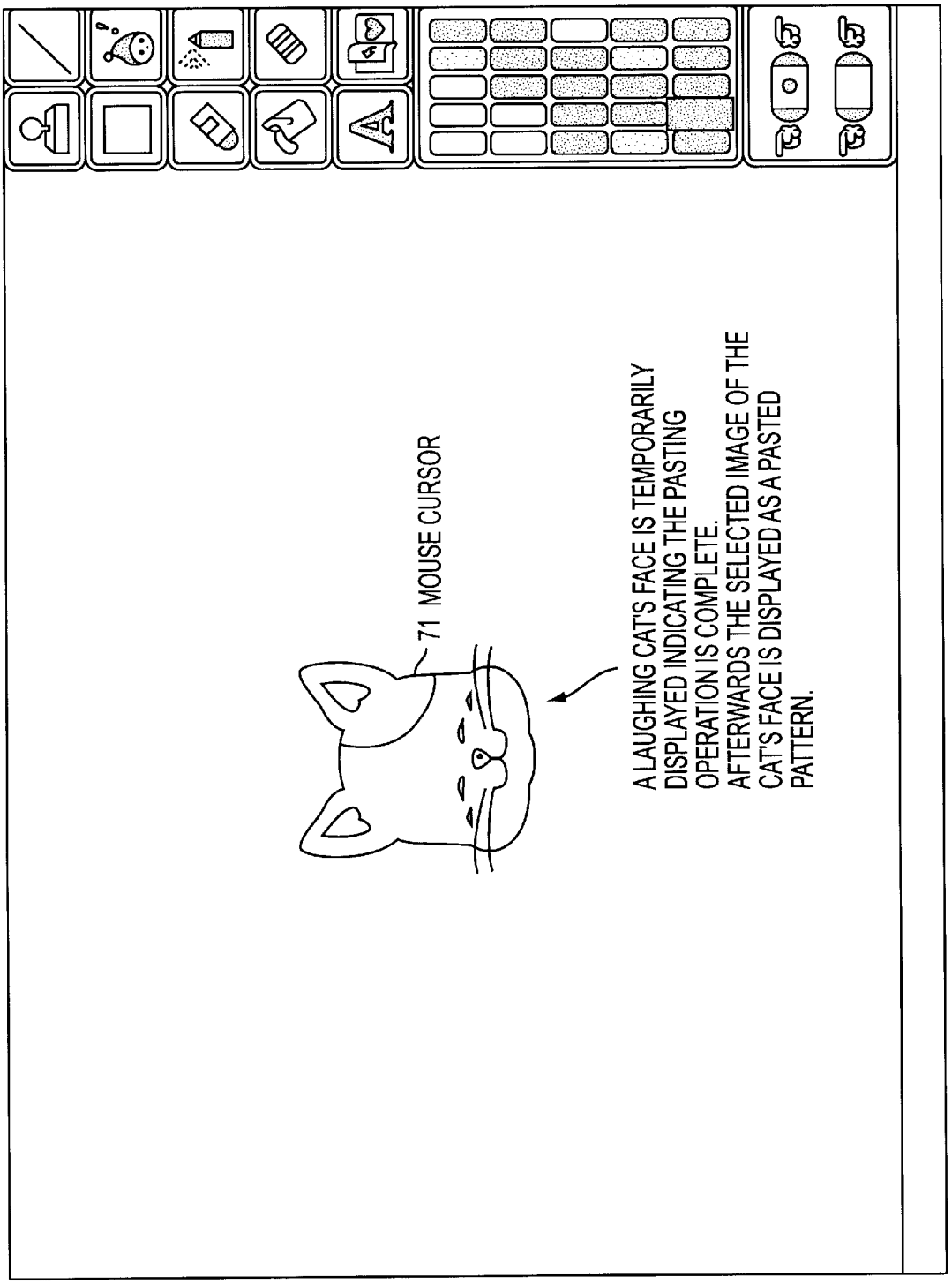
FIG. 8 is the fourth display example of the present invention.

In FIGS. 7 and 8, other animation image examples for displaying during a pasting operation are illustrated.

The situation in which the cat's face is selected from the pattern list window 41 shown in FIG. 4 is illustrated in FIG. 7. By selecting the cat's face, the form of the mouse cursor 71 becomes the cat's face, demonstrating to the user what is selected. In this situation, the cat's face is pasted to the indicated position on the main screen by moving the mouse cursor 71, positioning, and clicking the mouse button.

FIG. 8 illustrates the situation in which an animation image showing a laughing cat's face, as the animation image indicating that the pasting operation has finished completely, is allocated as image data, and then the image pattern of the cat is pasted on the main screen after the design of the mouse cursor 71 showed the image pattern of the cat.

FIGS. 9 through 12 illustrate examples for drawing lines according to the present invention.

Figure 9A:
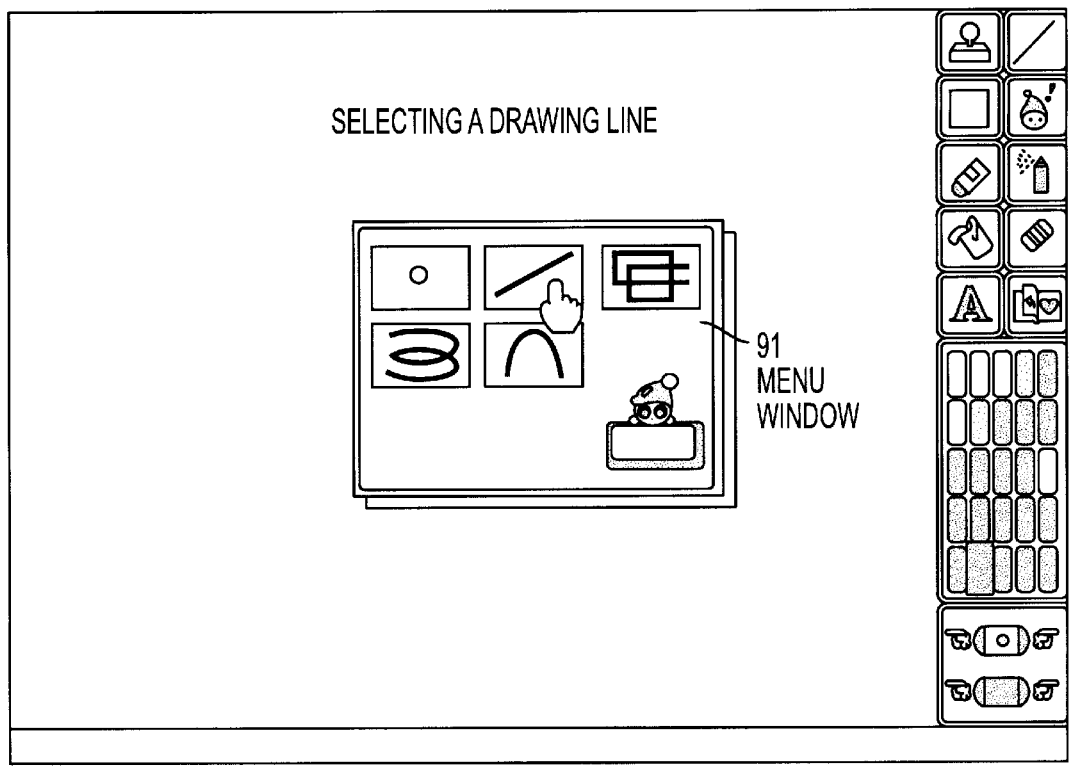
FIG. 9A is the fifth display example of the present invention.
Figure 9B:
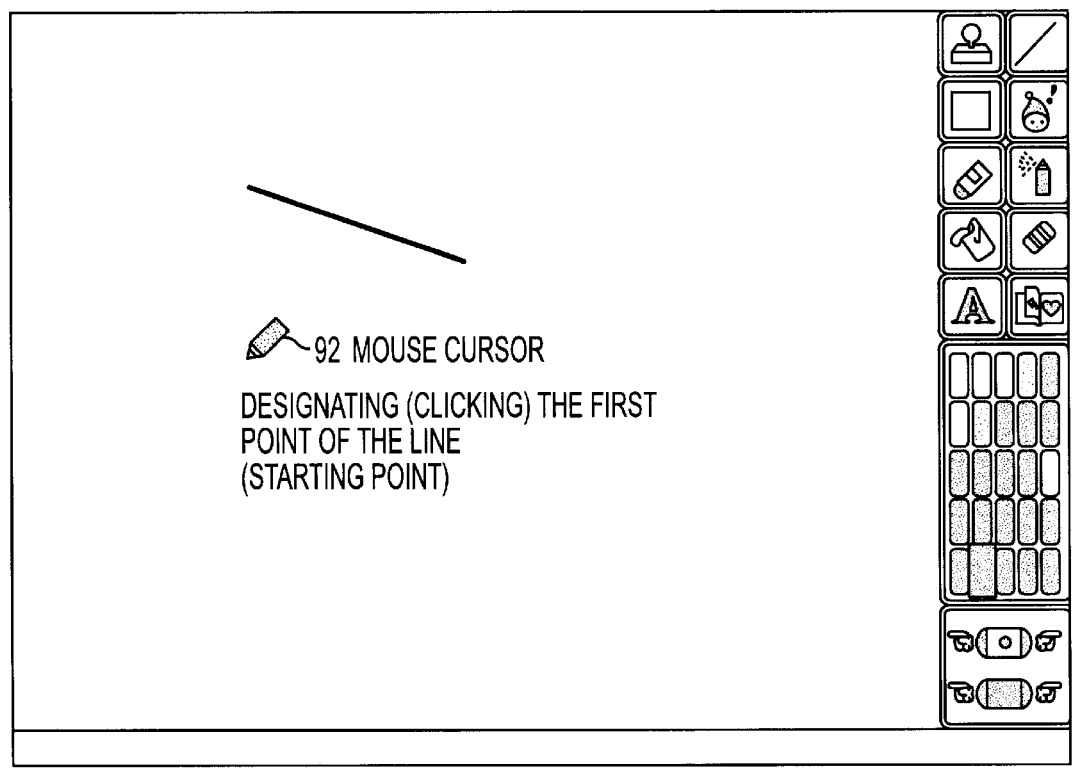
FIG. 9B is the sixth display example of the present invention.
Figure 10A:
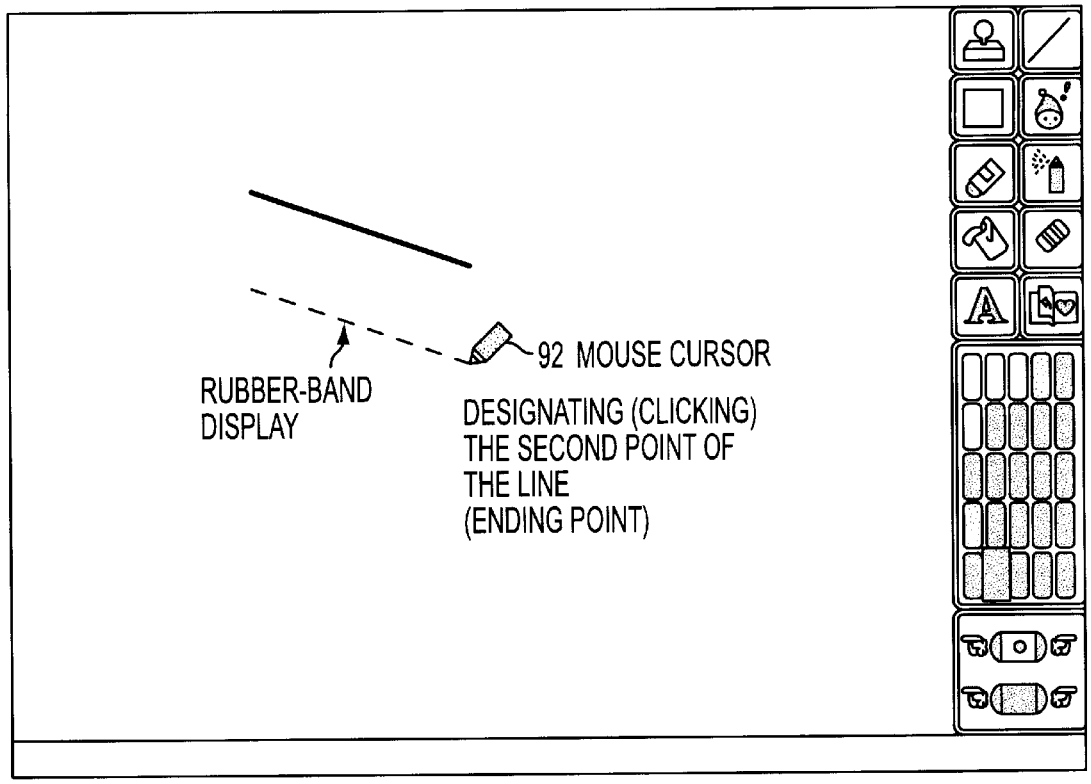
FIG. 10A is the seventh display example of the present invention.

Initially, as shown in FIG. 9A, a menu window 91 is displayed, and the type of line to be drawn is selected. Then, as shown in FIG. 9B, the mouse cursor is positioned at the start point for drawing the line, and is clicked. Here, the shape of the mouse cursor 92 has been changed to the shape of a pencil corresponding to selecting to draw a line. After the start point is clicked, the mouse cursor 92 in the shape of a pencil is moved to the end point of the line, as shown in FIG. 10A. At this moment, the line is generally displayed in rubber-band style from the start point to the end point. The operator can plan the desired line with reference to this rubber-band display. Thus, when the position of the end point is decided, the line is pasted to that point by clicking the mouse.

Figure 10B:
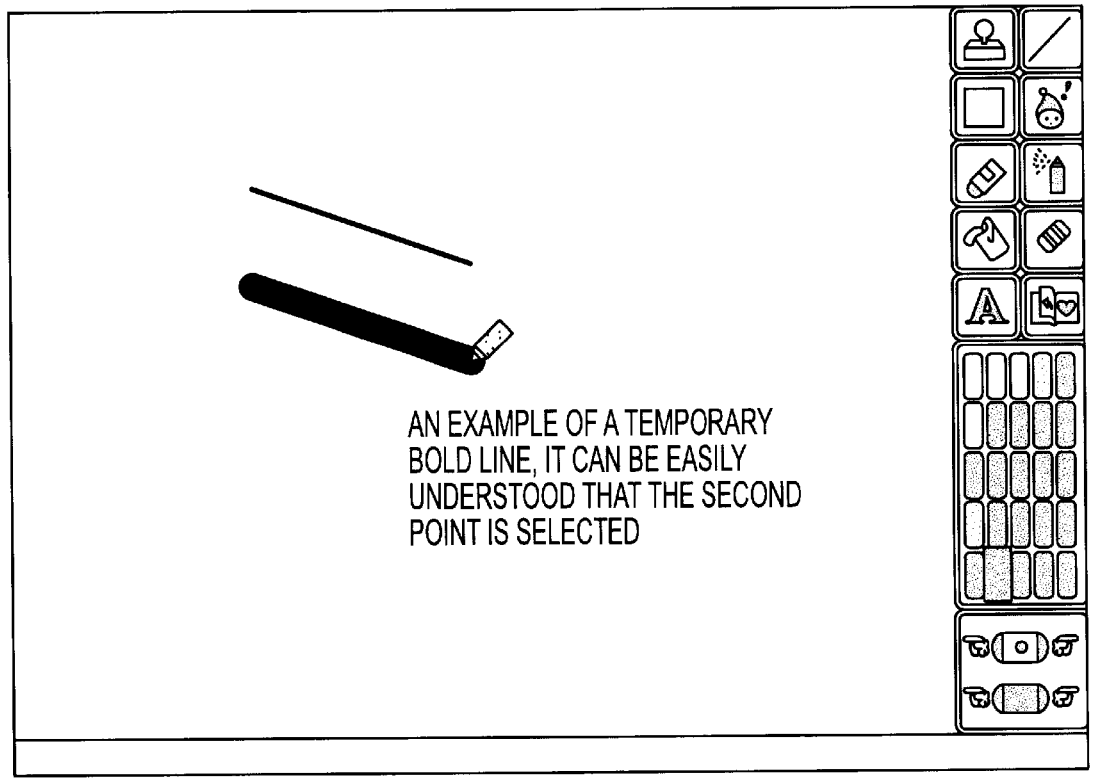
FIG. 10B is the eighth display example of the present invention.
Figure 11A:
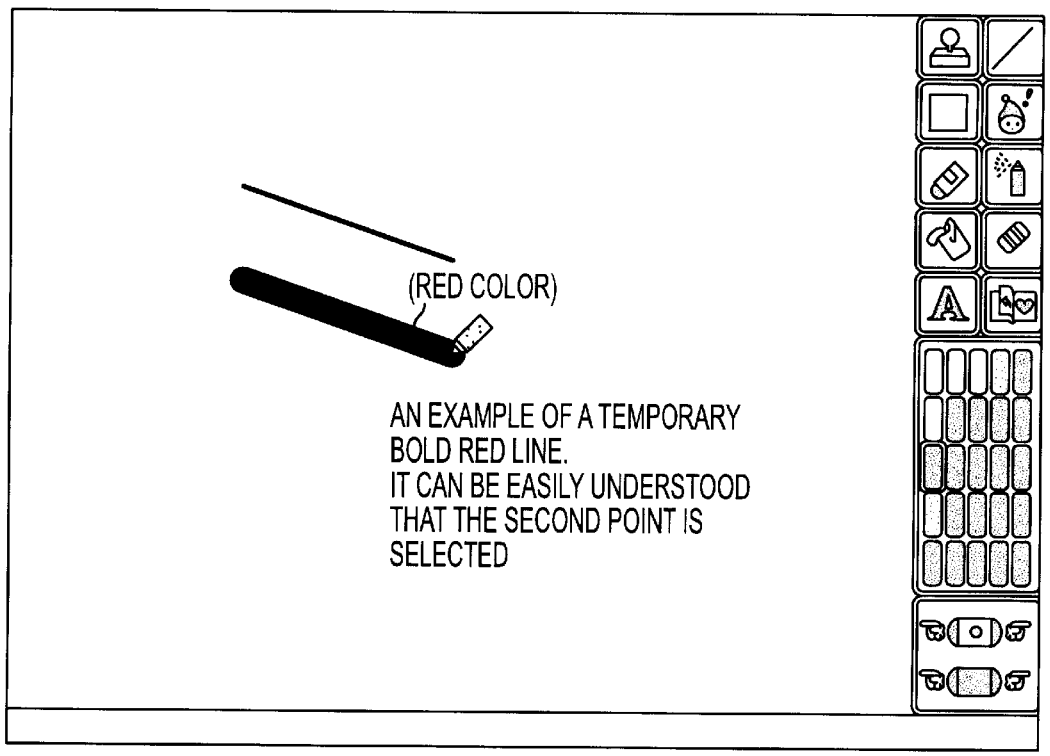
FIG. 11A is the ninth display example of the present invention.

FIG. 10B illustrates an example for displaying an animation image in which the line is thickened when the line is pasted. FIG. 11A illustrates an example for thickening the line and changing its color to, for example, red at the same time, when the line is pasted. (In this figure, a monochrome picture image is shown, but in the actual situation for displaying on the display unit 11, a color image is displayed in red.)

Figure 11B:
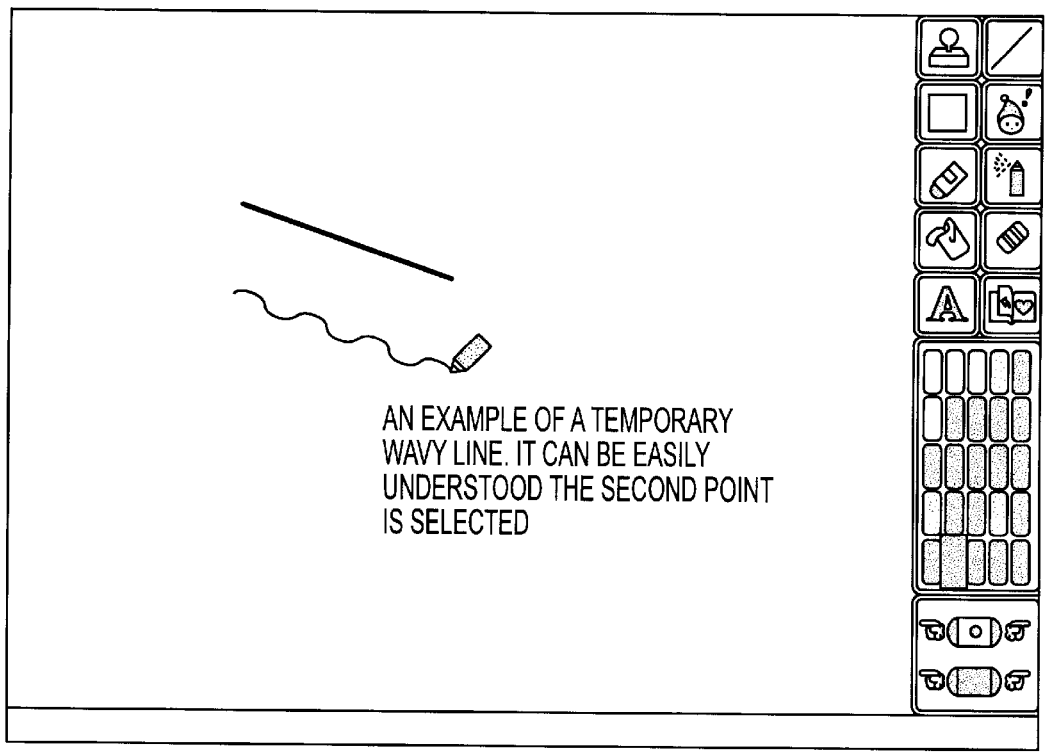
FIG. 11B is the tenth display example of the present invention.

FIG. 11B illustrates an example for making the line temporarily wavy when the end point is clicked.

Figure 12:
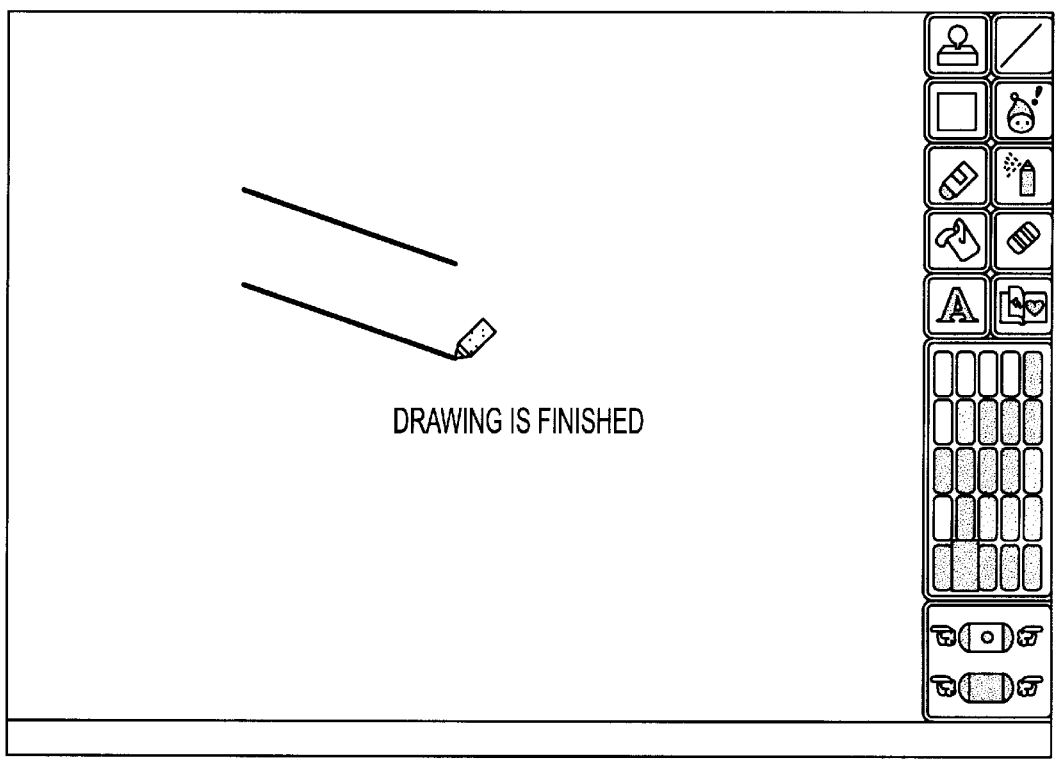
FIG. 12 is the eleventh display example of the present invention.

As shown in FIGS. 10B thorough 11B, various kinds of animated displays are possible to indicate pasting of the line. After displaying these animated images, the line is pasted between the positions where the start point and the end point are designated as shown in FIG. 12.

In the examples shown in FIGS. 10B thorough 11B, the designated program should be corresponded to the function for drawing a line because the specified animation image is not displayed, but various kinds of lines need to be displayed based on the required shape of a line to be drawn. These programs can be made in order to display various kinds of lines according to the system designer's choice.

Although specific display examples has been used for explaining the above described preferred embodiment, the present invention is not limited to the above described embodiment, but the apparatus and the method for displaying any kind of image as the modification from the present invention are also possible in order to identify visually when an image pattern is pasted.

In particular, the data corresponding to the image data and operation are not limited to a fixed form of animation information data, but the programs for changing the color or shape of the pasted objects are also possible for identifying visually the pasted subject. Namely, the meaning of the "animation image" of the present invention widely contains any kind of display images, and accordingly all kinds of pasting operations are possible in the present invention.

Further, although the animation images in which the cat's face temporarily changes to a laughing face, the dog's face temporarily becomes large, and the line is temporarily wavy for displaying, are described in the preferred embodiment, it is also possible to display the above described animation images in the present invention such that the size of the dog's face changes gradually from small to bigger, the cat laughs with opening and closing of its mouth, and the wavy shape is moved gradually from side to side, etc.

When the operation for pasting any pattern to a screen in which picture image drawing is currently in progress is implemented, the operator can know visually that the pasting operation has been completed. Further, the effect of making the graphics creation fun for children is realized by contriving the animation images, etc., which are prepared for each pasting pattern or operation.

In particular, as the graphics creation apparatus for children, the effect for increasing children's interest is realized in comparison with the conventional apparatus and method, thus a significant contribution to the children's entertainment and education industry can be expected.

What is claimed is:

1. A graphics creation method for creating graphics on a display, comprising the steps of:
    selecting an image pattern to be pasted on a display screen;
    moving the image pattern to a position to be pasted;
    performing a pasting operation; and
    automatically displaying a designated animation modifying the pasted image pattern on said display screen at the position when the pasting operation of said image pattern is completed.
2. The method according to claim 1, wherein
    said image pattern is a picture of an animal's face, and said designated animation shows a facial expression change according to each animal face.
3. The method according to claim 1, wherein
    said animation picture is displayed with enlargement of a size of a pasted image pattern.
4. The method according to claim 1, wherein
    said animation is displayed by changing a color of an image pattern to be pasted.
5. The method according to claim 1, wherein
    said animation is displayed by making a line for an image pattern to be pasted wavy.
6. A graphics creation apparatus for creating picture images on a display screen, comprising:
    a memory that stores image pattern data of a plurality of image patterns to be pasted on the display screen and corresponding animation information data to be displayed when pasting of an image pattern is completed;
    input means for inputting an operator's pasting command of an image pattern onto the display screen;
    graphics creation means for referring to said image pattern data according to the operator's pasting command and creating picture image data for display based on corresponding animation information data when pasting of said image pattern is completed on the display screen; and
    a display controller that displays graphics display data generated by said graphics creation means on said display screen,
    whereby the graphics display data is automatically displayed at a position at which the image pattern is pasted, the graphics display data being modification of said image pattern data.
7. The apparatus according to claim 6, wherein
    said animation information data are program data for changing image pattern expression.
8. The apparatus according to claim 6, wherein
    said image pattern forms an animal's face and said animation information data are processing data for facial expression changes corresponding to each animal's face.
9. The apparatus according to claim 6, wherein
    said animation information data are display processing data for enlarging a size of an image pattern to be pasted.
10. The apparatus according to claim 6, wherein
    said animation information data are display processing data for changing a color of an image pattern to be pasted.
11. The apparatus according to claim 6, wherein
    said animation information data are display processing data for making wavy an image pattern line to be pasted.

12. A computer readable storage media encoded with software for causing a general purpose computer to create picture images on a display screen comprising the functions:

storing data of an image pattern to be pasted on a display screen and corresponding animation information data for displaying when pasting of said image pattern is completed;

receiving a command from an operator for pasting the image pattern onto said display screen;

generating graphics display data based on the animation information data for display when said image pattern is pasted on said display screen, by referring to stored data of the image pattern and the corresponding animation information data to create the graphics display data showing a modified image pattern data completed; and automatically displaying said graphics display data, on said display screen of the general purpose computer, at a position to which the image pattern data was pasted.

13. A computer readable storage media encoded software for causing a general purpose computer to create picture images on a display screen, comprising the function:

causing said computer to automatically display a designated animation image, modifying an image pattern on a position to which the image pattern is pasted, when pasting of the image pattern is completed.

* * * * *